(12) United States Patent
Wang et al.

(10) Patent No.: US 7,238,741 B2
(45) Date of Patent: Jul. 3, 2007

(54) CARBONACEOUS MATERIAL WITH BROAD AGGREGATE SIZE DISTRIBUTION AND IMPROVED DISPERSIBILITY

(75) Inventors: Weidong Wang, Marietta, GA (US); Charles R. Herd, Woodstock, GA (US); Jorge A. Ayala, Kennesaw, GA (US)

(73) Assignee: Columbian Chemicals Company, Marietta, GA (US)

( * ) Notice: Subject to any disclaimer, the term of this patent is extended or adjusted under 35 U.S.C. 154(b) by 0 days.

(21) Appl. No.: 10/845,368

(22) Filed: May 13, 2004

(65) Prior Publication Data

US 2005/0256249 A1 Nov. 17, 2005

(51) Int. Cl.
*C08K 3/04* (2006.01)

(52) U.S. Cl. ............... 524/496; 524/495; 423/445; 423/449.1

(58) Field of Classification Search ............ 423/449.2, 423/275, 276, 445, 449.1; 524/495, 496
See application file for complete search history.

(56) References Cited

U.S. PATENT DOCUMENTS 4,228,143 A * 10/1980 Cheng et al. ............ 423/445 R
6,608,132 B1 * 8/2003 Bomo et al. .............. 524/496

FOREIGN PATENT DOCUMENTS

| | | | |
|---|---|---|---|
| EP | 872514 A1 | * | 10/1998 |
| EP | 1095972 A1 | * | 5/2001 |
| JP | 62290738 A | * | 12/1987 |
| JP | 2001181534 A | * | 7/2001 |
| WO | WO 9113944 A1 | * | 9/1991 |

OTHER PUBLICATIONS

Hawley's Condensed Chemical Dictionary. Richard J. Lewis, Sr. Fourteenth Edition. John Wiley & Sons, Inc. 2002.*
Material Data Sheet. VULCAN 6 [online]. Cabot Corp. 1995-2005. [retrieved on Oct. 12, 2005]. Retrieved from the internet (URL in box below).*
http://www.cabot-corp.com/cws/product.nsf/PDSDOCKEY/~~~V6?OpenDocument&bc=Products+%26+Markets/Industrial+Rubber+Products/Data+Sheets+%26+MSDS&bcn=23/4294967141/3033&entry=market.*
Translation for JP 62/290738.*

* cited by examiner

*Primary Examiner*—Peter Szekely
(74) *Attorney, Agent, or Firm*—Garvey, Smith, Nehrbass & North, L.L.C.; Gregory C. Smith

(57) ABSTRACT

A carbon black with a ΔD50/M greater than about 0.9 was produced. The carbon black has an aggregate heterogeneity index (HI) via QTM of greater than about 2.3. The carbon black has a ΔD50 via DCP of greater than about 0.07 μm. The QTM-HI of the present carbon black is unique for N100-200 series carbon blacks, as is the ΔD50. The carbon black is a N200 carbon black with an oil absorption number (OAN) less than about 135 ml/100 g and a HI of greater than about 2.3. The carbon black is also a N200 carbon black with an oil absorption number (OAN) less than about 135 ml/100 g and a ΔD50 of greater than about 0.07 μm. The present invention also relates to a polymeric composition and to tires comprising a carbon black of the present invention.

10 Claims, 2 Drawing Sheets

CARBONACEOUS MATERIAL WITH BROAD AGGREGATE SIZE DISTRIBUTION AND IMPROVED DISPERSIBILITY

BACKGROUND OF THE INVENTION

Carbon black is an engineered, particulate elemental carbon found in countless items used on a daily basis. It is an essential ingredient in, for example, tires and other mechanical rubber goods, improving their strength, durability, and overall performance. It also is used as a pigment in, for example, printing inks, paints, and plastics.

Carbon blacks for rubber applications are typically identified by a four-character "N" or "S" number, e.g., NXXX or SXXX. The category (grade) is determined by ASTM D1765. The first character of the category gives some indication of the influence of the carbon black on the rate of cure of a typical rubber formulation containing the black. The second character gives information on the average surface area of the carbon black. Blacks with the same second character are grouped into a series ending in "00," e.g., N200 series. The last two characters are assigned arbitrarily. Iodine absorption number (Iodine no.) (ASTM D1510, ISO 1304) has been the primary indication of surface area for defining different grades. Nitrogen surface area (NSA, ASTM D6556) and statistical thickness surface area (STSA, ASTM D6556) are now used more frequently for surface area. N-dibutyl phthalate absorption (DBPA) (ASTM D2414, ISO 4656/1)(now oil absorption number, OAN, ASTM D2414) has been the primary structure indicator in distinguishing different carbon black grades.

The physical characteristics (morphology) of carbon black, such as particle size and structure, affect various processing characteristics and various performance properties of end products, e.g., tires, such as tire treadwear, rolling resistance, heat buildup, and tear resistance. Accordingly, different grade carbon blacks are used in different polymeric formulations depending on the specific service requirements of the tires. Various grades of carbon black are also used in various parts of a tire, for example, N100, N200, and N300 series blacks are often used in treads, while N300, N500, N600, and N700 series blacks are often found in sidewalls and carcasses.

Morphological characteristics of carbon black include, for example, particle size/fineness, surface area, aggregate size/structure, aggregate size distribution, and aggregate shape.

Particle size is a measurement of diameter of the primary particles of carbon black. These roughly spherical particles of carbon black have an average diameter in the nanometers range. Particle size can be measured directly via electron microscopy or by indirect surface area measurement. Average particle size is an important factor that determines relative color strength of a carbon black and dispersibility. At equal structure, smaller particle size imparts stronger color and increased difficulty of dispersion. Fineness is a measure of the particle size.

Surface area of carbon black is a function of particle size and porosity. Surface area is measured by gas and liquid phase adsorption techniques and depends on the amount of adsorbent required to form a surface monolayer. Nitrogen surface area (NSA, ASTM D6556) and statistical thickness surface area (STSA, ASTM D6556) are better measures than iodine adsorption number (Iodine no., ASTM D1510) of the true surface area, since they are less influenced by the chemical composition of the carbon black surface. These tests use liquid nitrogen and are based on the original Brunauer, Emmett, and Teller (BET) method, but use a multi-point measurement to exclude the adsorption in the micropores. In a final application, surface area reflects the area accessible to rubber molecules per unit weight of carbon black. High surface area is associated with a high level of reinforcement, but at the expense of more difficult dispersion, processing, and increased hysteresis.

Carbon black particles coalesce to form larger clusters, aggregates, which are the dispersible units of carbon black. Aggregate size is controlled in the reactor. Measurement of aggregate structure may be obtained from electron microscopy or oil absorption. Grades with relatively large aggregates are high structure grades which are bulkier, have more void space, and high oil absorptions at given surface areas. The carbon black structure is determined by the shape and size of the carbon black aggregates. High structure carbon black increases rubber compound viscosity, modulus, and conductivity. High structure also reduces die swell, loading capacity, and improves dispersibility. Lower structure blacks give higher elongation, and increased carbon black loading reduces the elongation. If all other features of a carbon black are kept constant, narrow aggregate size distribution increases difficulty of carbon black dispersion and lowers resilience.

Aggregate size distribution (ASD) is a measure of the distribution of the size of carbon black aggregates and has been recognized as one factor important in the reinforcing ability of rubber. Donnet, et al., "Carbon Black Science and Technology," $2^{nd}$ ed., Marcel Dekker, Inc. New York (1993), pp. 289–347; Jones, "ASTM Committee D24: Keeping the Rubber Industry in the Black," Standardization News (August 1992; updated Melsom, January 1998) http://www.astm.org/COMMIT/CUSTOM1/D24.htm. Broad ASD carbon black shows a tendency to decrease the rolling resistance of tire tread. You, et al., "A New Characterization method of Tread Carbon Black by Statistical Regression Treatment," DC Chemical Co. Ltd, (Korea) http://www.dcchem.co.kr/english/product/p petr/image/carbon%20black att2.pdf. A broad aggregate size distribution will provide a faster carbon black incorporation and improved carbon black dispersibility in a polymeric (e.g., rubber) matrix.

Surface chemistry is a measure of chemisorbed species on the carbon black surface. These organic functional groups can enhance performance of blacks in certain applications.

Processing characteristics of the black and the physical characteristics of the end product, such as cured rubber, are often measured (in addition to characteristics of the carbon black itself) to compare the relative effects of various carbon blacks for a given polymeric test formulation. Processing characteristics include, for example, mixing energy and black incorporation time. End product characteristics include, for example, dispersion index, tear, tensile strength, Mooney viscosity, modulus, DIN abrasion, fatigue, and rebound.

Black incorporation time (BIT) is the time required to incorporate carbon black into a particular polymeric formulation. When carbon black is mixed with rubber, the first step is penetration of rubber into void space, replacing the trapped air and eliminating loose black. This step is called carbon black incorporation. The time required to fill all the voids with rubber is referred to as black incorporation time. A short black incorporation time may reduce actual mixing time and increase mixing equipment throughput.

Dispersion index (DI) is a measurement of the dispersion of the carbon black in a polymeric formulation/cured rubber. Following carbon black incorporation, the aggregates are separated from each other and are dispersed throughout the rubber. The state of dispersion of the carbon black is usually measured by carbon black dispersion index. A poor level of carbon black dispersion may cause premature failure of a final rubber product and less favorable ultimate properties, such as fatigue life, tear strength, and tread wear.

Current commercial grade N200 series carbon blacks, such as N234 and N299, can provide good properties in end products, such as tensile, fatigue, and dynamic properties in a rubber composition, if they are properly dispersed in the rubber matrix. However, the dispersion level of these finer conventional grade carbon blacks can differ depending on the rubber formulation and mixing parameters employed. The performance of a rubber composition with a good carbon black dispersion is superior to the same rubber composition with the same carbon black poorly dispersed. Coarser grades such as N300 (and higher numbered) blacks are more easily dispersed but their end product reinforcement characteristics are not as good as the finer blacks, if both are properly dispersed.

Thus, a balancing act between the carbon black grade, rubber formulation (including, e.g., added dispersants), and mixing conditions/time (e.g., greater time and mixing energy for greater dispersion) is required from the rubber compounder. From the standpoint of end product performance, predictability, and operating costs (e.g., energy input and throughput), it is very desirable to be able to engineer carbon blacks to simultaneously provide all of the desired dispersion and performance characteristics.

SUMMARY OF THE INVENTION

Described herein is a carbonaceous material, e.g., carbon black, with a broad aggregate size distribution and greatly improved dispersibility.

The present invention relates to a novel carbon black designed to improve the qualities of tire tread rubber formulations, including improved dispersion. The improved carbon black is in the N200 series (N200 encompasses 100–120 $m^2$/g NSA), and when in rubber, combines the dispersion advantages of coarser blacks with the performance advantages of the finer blacks, such as the N200 blacks. The carbon black of the present invention is particularly well suited for improving the qualities of, for example, tread for truck tires.

A carbon black of the present invention has a $\Delta D50/M$ of greater than about 0.9, as measured by sedimentation using a disk centrifuge (DCP). A carbon black of the present invention has an aggregate heterogeneity index (HI) of greater than about 2.3, as measured by transmission electron microscopy/automated image analysis (QTM). A carbon black material of the present invention has a $\Delta D50$ via DCP of greater than about 0.07 µm.

The QTM-HI of the present carbon black is unique for N100–200 series carbon blacks, as is the $\Delta D50$. The carbon black is a N200 carbon black with an oil absorption number (OAN) less than about 135 ml/100 g and a HI of greater than about 2.3. This carbon black is also a N200 carbon black with an oil absorption number (OAN) less than about 135 m/100 g and a $\Delta D50$ of greater than about 0.07 µm.

The present invention also relates to a polymeric composition comprising a carbon black of the present invention.

Another aspect of the invention relates to tires and/or tire components comprising a carbon black of the present invention.

Additional advantages will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate several aspects described below.

DETAILED DESCRIPTION OF THE PREFERRED EMBODIMENT

Figure 1:
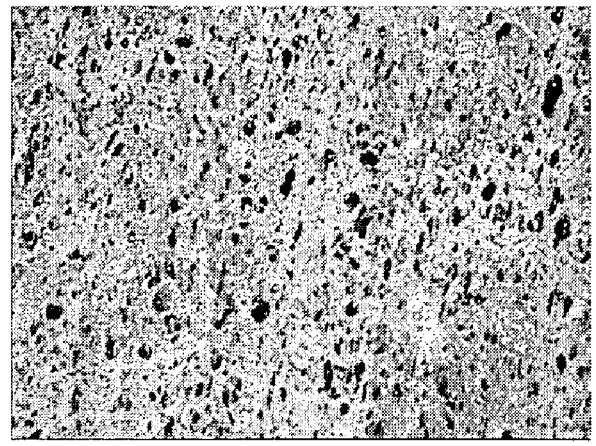
FIG. 1 shows a TEM of a conventional N234 carbon black dispersed within the cured rubber formulation of Example 5.
Figure 2:
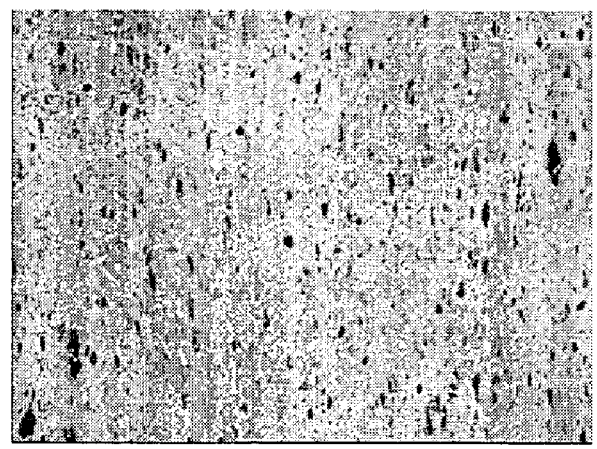
FIG. 2 shows a TEM of a carbon black of the current invention dispersed within the cured rubber formulation of Example 5.

Before the present compounds, compositions, articles, devices, and/or methods are disclosed and described, it is to be understood that the aspects described below are not limited to specific synthetic methods, specific methods as such may, of course, vary. It is also to be understood that the terminology used herein is for the purpose of describing particular aspects only and is not intended to be limiting.

In this specification and in the claims that follow, reference will be made to a number of terms which shall be defined to have the following meanings:

It must be noted that, as used in the specification and the appended claims, the singular forms "a," "an," and "the" include plural referents unless the context clearly dictates otherwise. Thus, for example, reference to "an elastomer" includes mixtures of elastomers, reference to "a rubber" includes mixtures of two or more rubbers, and the like.

"Optional" or "optionally" means that the subsequently described event or circumstance may or may not occur, and that the description includes instances where the event or circumstance occurs and instances where it does not. For example, the phrase "optionally adding curatives" means that the curatives may or may not be added and that the description includes both compositions without curatives and compositions comprising curatives.

Ranges may be expressed herein as from "about" one particular value and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

References in the specification and concluding claims to parts by weight, of a particular element or component in a composition or article, denotes the weight relationship between the element or component and any other elements or components in the composition or article for which a part by weight is expressed. Thus, in a composition containing 2 parts by weight of component X and 5 parts by weight component Y, X and Y are present at a weight ratio of 2:5, and are present in such ratio regardless of whether additional components are contained in the composition.

The current carbonaceous material was invented from a desire to achieve a carbon black with a broad aggregate size distribution, narrow particle size distribution, high surface activity, soft beads to promote improved dispersion, and improved dispersibility in rubber versus conventional N200 blacks, such as N234.

Until now there has generally always been a trade off between dispersion advantages of the coarser blacks and the greater reinforcement characteristics of the finer blacks.

A. Compositions

Carbon Black

The novel carbonaceous material of the present invention can be a carbon black. The carbon black of the present invention is described herein.

Morphology

The morphology of carbon black includes characteristics such as particle size, surface area, aggregate size/structure, and aggregate size distribution. The primary units of carbon black are aggregates, which are formed when particles collide and fuse together in the combustion zone of the reactor. Several of those aggregates may be held together by weak forces to form agglomerates. These agglomerates will break down during mixing into rubber, so the aggregates are the smallest ultimate dispersible unit of carbon black.

Colloidal and morphology values for two representative embodiments of the carbonaceous material, e.g., carbon black, of the current invention are given in Examples 2–4 below.

As shown in the Examples, the carbon black of the present invention was made and then measured for various morphological properties. It was also compared head-to-head with various commercial ASTM (N121, N234, N299) and specialty carbon blacks (very high structure N100 and N300s). Structure, surface area, tint strength, and aggregate size distribution were measured, according to the following methods:

| | |
|---|---|
| Oil absorption number, OAN (ml/100 g) | ASTM D2414 |
| Compressed oil absorption number, COAN (ml/100 g) | ASTM D3493 |
| Iodine number, Iodine No. (mg/g) | ASTM D1510 |
| Nitrogen surface area, NSA ($m^2/g$) | ASTM D6556 |
| Statistical thickness surface area, STSA ($m^2/g$) | ASTM D6556 |
| Tint Strength (% ITRB) | ASTM D3265 |
| QTM aggregate size distribution | ASTM D3849 |
| DCP aggregate size distribution | ISO/DIS 15825 |

The structure and fineness of the current carbonaceous material is within the range of conventional carbon black ASTM N200 grades, as can be seen from the representative numbers in Examples 2–3 below. The structure and surface area measurements were performed according to standard ASTM procedures. The numbers shown in Table 1 clearly indicate that this carbon black is a N200 series black with a moderately high structure. The NSA of the inventive carbon black embodiments falls squarely intermediate to the N121/N234 and N299 blacks. The OAN and COAN of the carbon black embodiments are approximately those of the N121 black. Current commercial grade N200 series carbon blacks, such as N234 and N299, can provide good properties, such as tensile, fatigue, and dynamic properties in a rubber composition, if they are properly dispersed in the rubber matrix. However, the dispersibility of these finer conventional grade carbon blacks is relatively difficult. This is in contrast to the carbon black of the current invention which disperses very well and maintains or exceeds the good performance properties of the conventional N200 grade blacks, as will be described further below.

The current carbonaceous material is an ASTM N200 series carbon black with broader aggregate size distribution (ASD) relative to current conventional products within this series. A broad aggregate size distribution may contribute to a fast carbon black incorporation and improved carbon black dispersibility in a polymeric (e.g., rubber) matrix. As used herein, improved dispersibility is understood to correlate to a higher level of dispersion for a given amount of mixing time/energy imparted. This invention targets significantly better carbon black dispersion so that the performances of rubber compositions containing the carbon black will exceed those of conventional commercial blacks.

Transmission electron microscopy analysis (QTM) (ASTM D3849) was used to analyze aggregate size distributional properties, Table 2. An embodiment of the carbon black material of the present invention has an aggregate heterogeneity index (HI) via QTM of greater than about 2.3. The HI can be greater than about 2.3, 2.35, or 2.4, specifically, the QTM-HI can be about 2.4.

Disk centrifuge photosedimentometry (DCP, ISO/DIS 15825) was also used to analyze aggregate size distributional properties, Table 3. The embodiments of carbon black material of the present invention have a ΔD50 via DCP of greater than about 0.07 μm. The ΔD50 can be greater than about 0.075 or 0.08 μm. The carbon black material has a ΔD50/M via DCP of greater than about 0.9 μm. The ΔD50/M can be greater than about 0.95.

The QTM-HI of the present carbon black embodiments is unique for N100–200 series carbon blacks, as is the ΔD50. The carbon black of the present invention is a N200 carbon black with an oil absorption number (OAN) less than about 135 ml/100 g and a HI of greater than about 2.3. The carbon black of the invention is also a N200 carbon black with an OAN less than about 135 ml/100 g and a ΔD50 of greater than about 0.07 μm.

Processing and End Product Characteristics

As shown in the Examples, the carbon black of the present invention was made, incorporated into a polymeric test formulation, and measured for various processing and end product properties. The carbon black of the present invention was also compared head-to-head on the measurements with a conventional N234 carbon black. Examples 5–7 show the results from two embodiments of this carbon black. Black incorporation time, dispersion index, undispersed area fraction, tensile strength, tear, rebound, and DIN abrasion were measured, according to the following methods:

| | |
|---|---|
| Black incorporation time, BIT (s) | Method described in Example 5 |
| Dispersion index, DI | ASTM D2663 |
| Undispersed area fraction (%) | IFM method |
| Tensile strength (MPa) | ASTM D412 |
| Tear (kN/M) | ASTM D624 |
| Rebound (%) | ASTM D1054 |
| DIN abrasion ($mm^3$) | DIN 53 516 |

A carbonaceous material of the present invention, carbon black, exhibits superior dispersion as measured by surfanalyzer (DI) and by interferometric microscopy (IFM)(undispersed area fraction) and eased dispersion (BIT).

Dispersion of carbon black is typically critical to its performance. Carbon black is optimally dispersed when separated into discrete aggregates. Dispersion involves deagglomeration. Deagglomeration breaks down the agglomerates into aggregates. The amount of energy needed in the dispersion step affects the mixing costs involved in forming the polymeric composition. Dispersibility can also affect overall cost and throughput since longer mixing time delays downstream processing unless additional high capital cost mixers are installed in the line. Addition of dispersants to aid in dispersion also increases cost.

Generally, as one tries to increase tensile strength, modulus, abrasion resistance, and fatigue life of a polymeric (rubber) formulation containing carbon black, the carbon black must be finer. However, the finer carbon black is more difficult to disperse. By instead using the carbon black of the present invention, faster mixing times and better dispersion are achieved while maintaining or increasing hot tear and abrasion properties.

Black incorporation time (BIT) was measured according to the method described in Example 5 using a standard natural rubber/butadiene polymer blend formulation. BIT showed that the embodiments of the carbon black of the current invention in the test formulation (as shown in Example 5) gave faster incorporation times than the conventional N234 black. The particular embodiments tested showed time savings of about 18–20%. This can translate to significant economic savings in processing and increased throughput for a particular mixer, for example, in a tire plant.

Dispersion index (DI) was determined by a surfanalyzer. ASTM D2663-95a, part c; ASTM Standard D2663-95a, "Standard Test Methods for Carbon Black—Dispersion in Rubber," *Annu. Book ASTM Stand.*, 09.01, 447 (2003); P. C. Vegvari, RUBBER CHEM. TECHNOL., 51(4), 817 (1978). The dispersion index of the embodiments of the current carbon black in the test formulation was significantly higher than the DI of the conventional N234 black. This shows a more homogeneous rubber composition which translates into better tire performance and less off-spec material to be re-processed or wasted.

Looking at dispersion from the undispersed carbon black side, interferometric microscopy (IFM) (Smith, A. P., et al., "Carbon Black Dispersion Measurement in Rubber Vulcanizates via Interferometric Microscopy," Paper No. 16, Proceedings of the 164$^{th}$ Fall Technical Meeting of the Rubber Division, American Chemical Society, Cleveland, Ohio, Oct. 14–17, 2003) showed an undispersed area fraction of the embodiments of the carbon black of the present invention in the test formulation significantly less than the fraction of the conventional N234 black. This again shows a more homogeneous composition which translates into better tire performance and less off-spec material.

The carbon black of the present invention has hot tear and DIN abrasion advantages over conventional blacks of the N200 series, in particular N234.

In-rubber performance properties of a polymeric test formulation were also tested according to standard procedures. This testing showed both an improved die C and hot tear for the compositions comprising the carbon black of the present invention. Improvement in hot tear is very difficult to achieve with conventional carbon blacks. This property is important for how a tire will perform under use conditions, since tires heat up as they roll. Hot tear (Tear Die C @ 100° C., ASTM D624) of the test formulation (shown in Example 6) using carbon black of the present invention was improved over the conventional N234 carbon black composition.

These test formulations were also tested for abrasion loss. Abrasion (DIN Abrasion, DIN 53 516) of the test formulation containing embodiments of the carbon black of the present invention was less than that of a conventional N234 carbon black formulation. Abrasion is a measurement of wear of a tire tread.

Production of the Carbon Black

An example of production of the carbon black of the present invention is given below in Example 1 and discussed in the Methods of making section.

Polymeric Compositions

The invention includes a composition comprising a polymer (e.g., elastomer) and a carbon black of the present invention.

Optionally, the polymeric composition can comprise additional components. For example, the composition can comprise curatives, oils, antioxidants, fillers, or a mixture thereof. The choice of additional components and amount of each can be determined by one of skill in the art based on those suitable for a desired application.

Tires are often composed of carbon black reinforced polymer systems that are based on natural rubber (NR) or blends of NR and synthetic polymers (e.g., butadiene rubber (BR)). Among the polymers, e.g., rubbers, suitable for use with the current invention are any natural rubbers, synthetic rubbers, and blends of natural and synthetic. These include, for example, NR, BR, styrene butadiene rubber (SBR), emulsion styrene butadiene rubber (ESBR), solution polymerization styrene butadiene rubber (SSBR), ethylene propylene diene monomer rubber (EPDM), butyl rubber, halobutyl rubber, or a mixture thereof. The choice of and amount of polymer can be determined by one of skill in the art based on those suitable for a desired application.

The amount of the carbon black of the present invention can be determined by one of ordinary skill, for example, from about 40 to about 120 parts per hundred rubber (phr). One of ordinary skill in the art can determine a suitable amount of the carbon black to use in a particular application as well as a suitable ratio relative to the other components.

A composition of the present invention is improved over compositions comprising conventional carbon black. The improved carbon black of the present invention imparts upon rubber compositions improved processing (e.g., dispersion) characteristics and, when cured, imparts improved performance characteristics, such as hot tear and abrasion.

Tire Tread

The invention includes tires and/or tire components made from a polymeric composition of the present invention which comprises a carbon black of the present invention. Truck tire treads are particularly well suited for production from the improved polymeric compositions comprising the carbon black of the present invention.

Tires and tire components can be made by conventional processes known to one of skill in the art, for example, a tire can be made by forming tire components, assembling tire components, and curing the assembled components in a mold under conditions suitable to form a tire. One of skill in the art can determine appropriate steps and tire components for making a tire for a desired application. Tires of the present invention exhibit improved performance characteristics, such as hot tear and abrasion.

B. Methods

Methods of Making

Carbon black is produced by the partial oxidation or thermal decomposition of hydrocarbon gases or liquids. A broad range of carbon black types can be made by controlled manipulation of the reactor conditions. The carbon black formation reaction in the furnace can be controlled by quenching, such as by steam or water spray. The carbon black particles produced can be conveyed through the reactor, cooled, and continuously collected, such as via filters.

The carbon black material of the present invention can be made using techniques generally known in the carbon black art. One particular method of making the carbon black is described below in Example 1. Variations on this method can be determined by one of skill in the art.

The carbon blacks of the present invention can be produced in a carbon black tread reactor having a combustion section and a reaction section. An example reactor suitable for use in production of the blacks is described generally in U.S. Pat. Nos. 4,927,607 and 5,256,388, the disclosures of which are hereby incorporated by reference in their entireties. Other carbon black reactors can be used. One of skill in the art can determine an appropriate reactor for a particular application. The sections of the reactor need not be distinct physical sections, but can instead be areas within the reactor performing the correct functions. All or part of a hydrocarbon feedstock may be injected into the hot combustion stream from the combustion section. The feedstock can be injected radially or axially to the walls of the reactor. The location of the feedstock injection(s) is generally located upstream of or within the choke section or the reactor. This mixture passes to the reaction zone. A quench section follows which slows and/or stops the reaction. The location of the quench is generally downstream of the exit of the choke section. The reaction is stopped when the carbon black of the present invention has been formed.

After being quenched, the carbon black and gases can be further cooled and separated. Essentially any conventional cooling and separating methods can be used. The separation is often achieved using a bag filter. The carbon black can be further readied for use, storage, or shipping. For example, carbon black is often pelletized using, for example, wet beading. Downstream processing is not critical to the carbon blacks of the present invention. One of skill in the art can determine appropriate downstream processing for a particular application.

Feedstock, combustion feeds, and quenching materials are well known in the carbon black art and one example is given below in Example 1. The choice of these feeds is not critical to the carbon blacks of the present invention. One of skill in the art can determine appropriate feeds for a particular application. The amounts of feedstock, combustion feeds, and quenching materials can also be determined by one of skill in the art which are suitable for a particular application.

Methods of making the polymeric composition comprising the carbon black of the invention can utilize techniques generally known in the polymer, e.g., rubber, compounding arts. Variations on these methods can be determined by those skilled in the art. Examples 5–6 show examples of compositions which comprise the carbon black of the present invention. The carbon black can be added to the polymer and the combination can be mixed until the carbon black is dispersed to the desired degree. Additional steps and components can be added as determined by one of skill in the art.

Methods of making tires and/or tire components from the polymeric composition comprising the carbon black of the invention can utilize techniques generally known in the tire manufacturing arts. Variations on these methods can be determined by those skilled in the art. Tires can be made by conventional processes known to one of skill in the art, for example, by forming tire components, assembling tire components, and curing the assembled components in a mold under conditions suitable to form a tire. One of skill in the art can determine appropriate steps and tire components for making a tire for a desired application.

C. Applications

The carbon black material of the current invention is very useful in polymeric compositions, particularly those used in tire applications. Formulations and mixing recipes are generally known and would be adjusted accordingly based on the improved characteristics of the carbon black. Polymeric compositions made from the carbon black of the present invention have improved processing properties relative to conventional N200 carbon blacks.

Tire treads, especially truck and passenger tire treads, made from the carbon black and polymeric compositions comprising the carbon black of the present invention have improved properties relative to those same components comprising conventional N200 carbon blacks.

EXAMPLES

The following examples are put forth so as to provide those of ordinary skill in the art with a complete disclosure and description of how the compounds, compositions, articles, devices, and/or methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. Only reasonable and routine experimentation will be required to optimize such process conditions.

Example 1

Production of Carbon Black of Present Invention

The carbon black of the present invention was made in a standard carbon black tread reactor. The reactor was a 10" Columbian Axial Tread (CAT) reactor (as taught generally in U.S. Pat. Nos. 4,927,607 and 5,256,388) with a 10" square choke.

The reactor was operated at an air load of 12100 $Nm^3/hr$ with natural gas fuel at a rate of 733 $Nm^3/hr$ and an inlet air temperature of 738° C. Feedstock oil was preheated to 200° C. and was injected radially via 4 Spraying Systems (Wheaton, Ill.) G12W sprays positioned 24 inches upstream from the choke outlet and operating at a pressure of 150 psi. The carbon black formation reaction was quenched via water injected at a position 40 inches downstream from the choke outlet. Product structure was controlled using potassium carbonate at about 80 g/hr injected with the feedstock. The resultant product was wet beaded using sodium lignin sulfonate binder, dried, and collected for packaging.

Example 2

Colloidal Properties Comparison

The colloidal properties of 3 conventional commercial ASTM grade blacks (N234, N121, and N299 by Columbian Chemicals Company, Marietta, Ga.) and 4 other specialty grade blacks (CD2056, CD2079, CD2005, and CD2038, Columbian Chemicals Company, Marietta, Ga.) were compared to the carbon black of the present invention. The specialty grade blacks were included to show the effect of high structure on the morphology. Based on size and structure, the CD2079 and CD2056 blacks are categorized as N300 blacks. Based on size and structure, the CD2005 and CD2038 blacks are categorized as N100 very high structure (VHS) blacks.

TABLE 1

Comparative Colloidal Properties.

| Carbon Black | OAN (ml/100 g) ASTM D2414 | COAN (ml/100 g) ASTM D3493 | Iodine No. (mg/g) ASTM D1510 | NSA (m²/g) ASTM D6556 | STSA (m²/g) ASTM D6556 | Tint Strength (% ITRB) ASTM D3265 |
|---|---|---|---|---|---|---|
| N299 | 124 | 105 | 108 | 103 | 98 | 113 |
| N234 | 126 | 98.4 | 121 | 121 | 115 | 125 |
| N121 | 132 | 111 | 121 | 122 | 115 | 113 |
| Sample 1 | 133 | 112 | 110 | 112 | 108 | 115 |
| Sample 2 | 127 | 110 | 109 | 114 | 108 | 115 |
| CD2056 | 135 | 112 | 92 | 89 | 87 | 107 |
| CD2079 | 150 | 117 | 95 | 88 | 87 | 104 |
| CD2005 | 175 | 133 | 120 | 120 | 116 | 112 |
| CD2038 | 173 | 132 | 142 | 134 | 124 | 117 |

OAN = oil absorption number
COAN = compressed oil absorption number
NSA = nitrogen surface area
STSA = statistical thickness surface area
ITRB = industry tint reference black The NSA of the carbon black of the invention is intermediate to that of the N121/234 and N299 and, thus, falls into the N200 series. The structure is approximately the same as that of the N121 black.

Example 3

Aggregate Size Distributional Properties and OAN Comparison

A head-to-head comparison of the blacks from Example 2 was performed using transmission electron microscopy/automated image analysis (QTM) (ASTM D3849).

TABLE 2

QTM Aggregate Size Distributional Properties.

| Sample | M (nm) | SD (nm) | WM (nm) | HI | V'/V | OAN (ml/100 g) |
|---|---|---|---|---|---|---|
| CD2079 | 91.4 | 65.3 | 232 | 2.54 | 3.19 | 148 |
| CD2056 | 76.7 | 54.9 | 207 | 2.70 | 2.67 | 137 |
| CD2005 | 76.9 | 62.5 | 226 | 2.94 | 3.59 | 178 |
| CD2038 | 71.5 | 53.1 | 191 | 2.67 | 3.34 | 181 |
| N234 | 61.6 | 40.2 | 139 | 2.25 | 2.51 | 126 |
| Sample | 68.9 | 48.9 | 168 | 2.44 | 2.66 | 127 |
| N121 | 83.6 | 52.9 | 170 | 2.04 | 2.55 | 130 |
| N299 | 85.1 | 50.5 | 173 | 2.03 | 2.11 | 120 |

M = mean aggregate size
SD = standard deviation of mean aggregate size
WM = weight mean aggregate size
HI = heterogeneity index
V'/V = average aggregate absorptivity factor (relates to OAN)

This shows that the HI was very high compared to the N100 and N200 series blacks. Coarser grades and very high structure grades can have higher HI.

Example 4

DCP Comparison

A head-to-head comparison of the blacks from Example 2 was performed using disc centrifuge photosedimentometry (DCP) (ISO/DIS 15825).

TABLE 3

DCP Aggregate Size Distributional Properties.

| Sample | Range (μm) | Weight average (μm) | Mode (μm) | ΔD50 (μm) | ΔD50/M |
|---|---|---|---|---|---|
| N234 | 0.033~0.805 | 0.079 | 0.07 | 0.059 | 0.847 |
| N121 | | 0.094 | 0.081 | 0.069 | 0.85 |
| N299 | | 0.105 | 0.087 | 0.067 | 0.77 |
| Sample 1 | 0.033~0.446 | 0.102 | 0.087 | 0.083 | 0.957 |
| Sample 2 | 0.034~0.471 | 0.102 | 0.084 | 0.089 | 1.056 |
| CD2005 | | 0.110 | 0.100 | 0.081 | 0.814 |
| CD2038 | | 0.102 | 0.092 | 0.079 | 0.855 |
| CD2056 | | 0.107 | 0.099 | 0.088 | 0.892 |
| CD2079 | | 0.122 | 0.110 | 0.095 | 0.865 |

ΔD50 = full width at half height of the differential curve
ΔD50/M = ratio of ΔD50 and mode The broadest aggregate distribution as measured by ΔD50/M was found with the carbon black of the present invention regardless of structure or particle size.

Example 5

Dispersion Comparison

The carbon black of the present invention was evaluated against a N234 control for incorporation time and dispersion in a natural rubber (NR)/butadiene rubber (BR) blend. Mixing was done using a Brabender R2000 mini-mixer.

The BIT test method was as follows:
1. Switch on the heating for the mixer and allow the mixer to warm up and stabilize to 60° C., preferably overnight.
2. Weigh out the samples to be tested to the recipe in Table 4, including a warm up batch. For best results, duplicate mixes should be used, mixed in random order. The initial batch is to clean out and heat the mixing chamber only and the compound and mixer torque output should be discarded.
3. Repeat the following stages to mix all samples, including the warm up batch:

| | |
|---|---|
| a. Add rubber | 0 s |
| b. Ram up, add black and curatives | 30 s |
| c. Ram down | 60 s |
| d. Dump | 180 s |
| e. Clean out mixer and allow to cool to 60° C. | |

Figure 3:
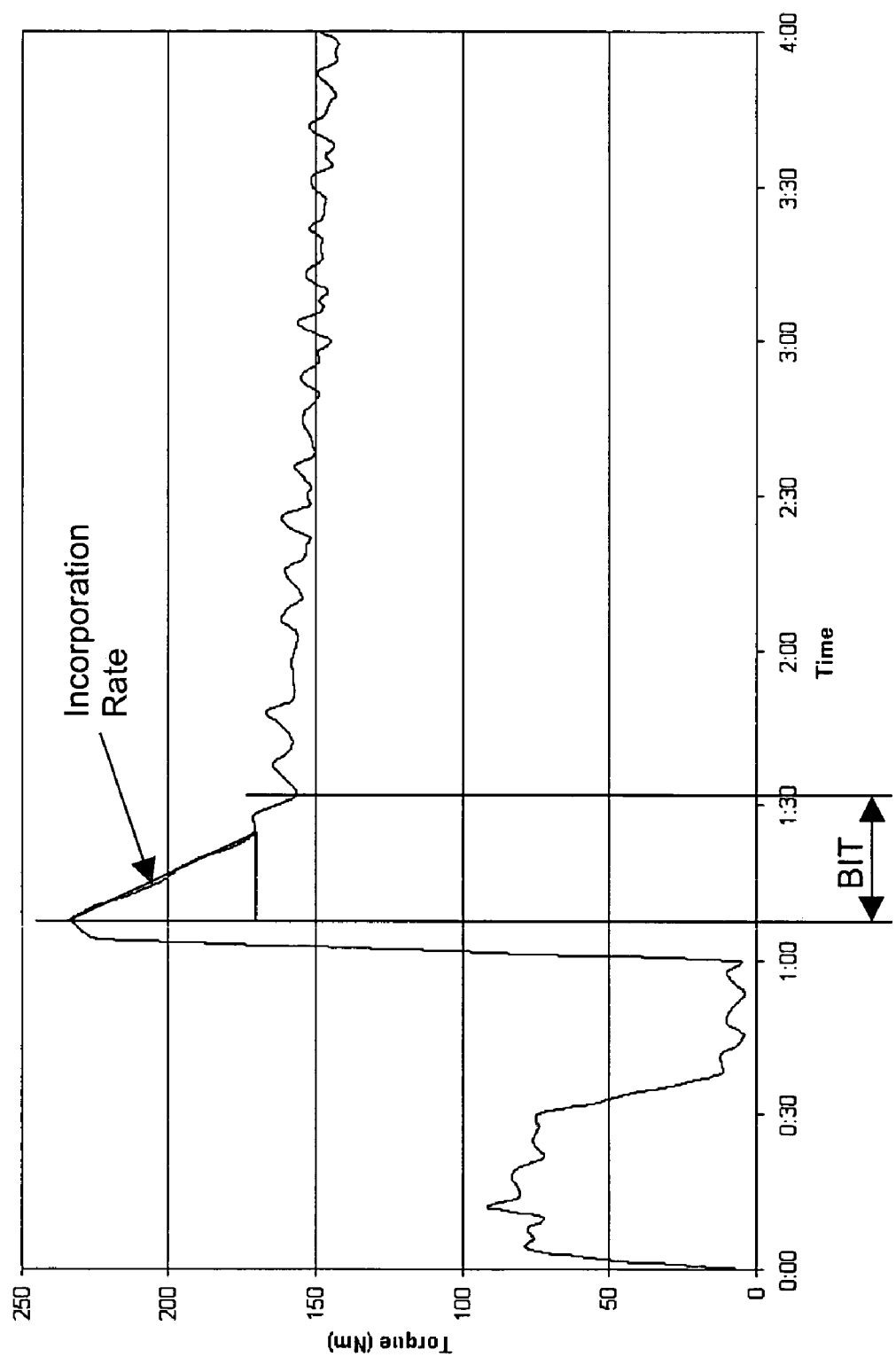
FIG. 3 shows an example mixer torque trace for the black incorporation time (BIT) method used in Example 5.

4. Record mixer torque while mixing. See, e.g., FIG. 3 for example torque trace.
5. From the measured torque trace, find the time at which the minimum torque occurs (see, e.g., FIG. 3). For the purposes of these tests, a polynomial was fitted through the duplicate data sets and the time for the mathematical minima calculated.
6. Calculate the BIT, defined as the time from ram down (60 s) to the time of the initial minimum, $$BIT = T_{min} - T_{ram}.$$

Black incorporation time (BIT) testing was done using a standard NR/BR blend with carbon black and curatives (to enable curing of samples for dispersion testing).

TABLE 4

Test Formulation.
Master Batch-phr (parts per hundred rubber)

|  | phr | Mini-mixer |  |
| --- | --- | --- | --- |
| Natural rubber | 60 | Start temp | 60 |
| Butadiene rubber | 40 | Rotor speed | 60 |
| Carbon black | 55 | Fill factor | 70% |
| Sulfur | 1.5 |  |  |
| MBS | 1.50 |  |  |

MBS = oxydiethylene benzothiazole-2-sulfenamide

TABLE 5

Incorporation results.

| Parameter | Standard N234 | Sample 1 | Sample 2 |
| --- | --- | --- | --- |
| BIT (s) | 66.2 | 54.3 | 53.3 |

The measurements are given as time in seconds to minimum torque (BIT). The data indicates that the black of the present invention achieves faster incorporation versus the standard N234 grade.

The carbon black of the present invention was found to have a faster incorporation time and an improved dispersion relative to the N234 control. The carbon black of the present invention had a significantly larger secondary incorporation peak compared to the N234 control.

TABLE 6

Dispersion results.

| Parameter | Standard N234 | Sample 1 | Sample 2 |
| --- | --- | --- | --- |
| DI, Dispersion Index | 61.5 | 88.3 | 86.5 |
| Undispersed area fraction, % | 26.2 | 14.5 | 14.7 |

DI was determined by a surfanalyzer ASTM D2663–95a, part c; ASTM Standard D2663–95a, "Standard Test Methods for Carbon Black—Dispersion in Rubber," Annu. Book ASTM Stand., 09.01, 447 (2003); P. C. Vegvari, Rubber Chem. Technol., 51(4), 817 (1978).

Undispersed area fraction was determined by interferometric microscopy (IFM) Smith, A. P., et al., "Carbon Black Dispersion Measurement in Rubber Vulcanizates via Interferometric Microscopy," Paper No. 16, Proceedings of the 164th Fall Technical Meeting of the Rubber Division, American Chemical Society, Cleveland, Ohio, Oct. 14–17, 2003.

The results show a substantial improvement in the dispersion level for the carbon black of the present invention versus the standard N234.

Example 6

In-Rubber Performance Properties Comparison

The in-rubber performance properties of the formulations using the carbon black of the present invention and the conventional N234 were tested and compared. The properties tested included tensile strength, modulus, elongation, hardness, hysteresis (HBU/Zwick), and hot tear.

TABLE 7

Test Formulation.
Masterbatch

|  | phr (parts per hundred rubber) |
| --- | --- |
| Natural rubber | 60 |
| Polybutadiene rubber | 40 |
| Carbon black | 55 |
| Zinc oxide | 4 |
| Stearic acid | 2 |
| 6 PPD | 2 |
| TMQ | 1 |
| Wax | 1 |
| Finish | 165 |
| TBBS | 1.1 |
| Sulfur | 1.8 |

6 PPD = N-(1,3-dimethylbutyl)-N'-phenyl-p-phenylenediamine
TMQ = polytrimethyl dihydroquinoline
TBBS = tert-butyl-2-benzothiazolesulfenamide Mixing Procedure
77 rpm, 40 psi, 100° F.

| Ram up/ram down Time (s) | Step |
| --- | --- |
| /0 | Rubber added |
| 30/45 | Chemicals, ½ black added |
| 70/85 | ½ black added |
| 110/130 | Sweep |
| 170 | Dump |

Mill @90° C., 0.0060" mill
Band, add cures
Cross blend, four times
Refine endwise, three times
Sheet off

TABLE 8

In-rubber cured properties.

| Property | N234 | Sample 1 | Sample 2 |
| --- | --- | --- | --- |
| 100% M, MPa ASTM D412 | 3.3 | 3.7 | 3.5 |
| 200% M, MPa ASTM D412 | 8.2 | 9.8 | 9.0 |
| 300% M, MPa ASTM D412 | 14.7 | 17.0 | 15.8 |
| Tensile, MPa ASTM D412 | 27.3 | 28.1 | 28.4 |
| Elongation, % ASTM D412 | 500 | 480 | 500 |
| Shore A ASTM D2240 | 69.9 | 70.7 | 69.3 |
| Tear Die C, (kN/M) ASTM D624 | 67.5 | 77.4 | 70.9 |
| Tear Die C @100° C. (kN/M) ASTM D624 | 50.2 | 55 | 54 |
| Zwick Rebound, % ASTM D1054 | 53.6 | 56.2 | 56.2 |
| HBU, ° C ASTM D623 | 59.7 | 60 | 59.8 |

100% M = 100% Modulus
200% M = 200% Modulus
300% M = 300% Modulus

Normally, blacks which are coarser or have higher structure have a decreasing tear. However, the present carbon black with coarser particles and higher structure than N234 gave higher tear strength than N234. It is believed that this increased tear is a result of better carbon black dispersion.

Example 7

Abrasion Testing Comparison

The DIN abrasion (DIN 53 516) of the Example 6 formulations using the carbon black of the present invention and the N234 were tested and compared. A lower abrasion number herein corresponds to better wear characteristics.

TABLE 9

DIN abrasion results.

| | DIN Abrasion (mm$^3$) | Standard Deviation (mm$^3$) |
|---|---|---|
| N234 | 65.9 | 0.72 |
| Sample 1 | 61.1 | 2.05 |
| Sample 2 | 63.6 | 2.09 |

Throughout this application, various publications are referenced. The disclosures of these publications in their entireties are hereby incorporated by reference into this application in order to more fully describe the compounds, compositions and methods described herein.

Various modifications and variations can be made to the compounds, compositions and methods described herein. Other aspects of the compounds, compositions and methods described herein will be apparent from consideration of the specification and practice of the compounds, compositions and methods disclosed herein. It is intended that the specification and examples be considered as exemplary.

What is claimed is:

1. A carbonaceous material with a ΔD50/M greater than about 0.9, a heterogeneity index (HI) via QTM greater than about 2.3, and an oil absorption number (OAN) less than about 135 ml/100 g.

2. The carbonaceous material of claim 1 wherein the carbonaceous material is carbon black.

3. The carbonaceous material of claim 2 wherein the fineness is within the range of ASTM N200 grade carbon blacks.

4. The carbonaceous material of claim 1 wherein the ΔD50 via DCP is greater than about 0.07 μm.

5. The carbonaceous material of claim 2 wherein when said carbon black is incorporated into an elastomeric composition, the dispersibility of the elastomeric composition is improved compared to the same elastomeric composition having conventional N200 series carbon black.

6. The carbonaceous material of claim 2 wherein when said carbon black is incorporated into an elastomeric composition and the composition subsequently cured, the hot tear of the cured elastomeric composition is improved compared to the same cured elastomeric composition having conventional N200 series carbon black.

7. The carbonaceous material of claim 2 wherein when said carbon black is incorporated into an elastomeric composition, and the composition subsequently cured the abrasion of the cured elastomeric composition is improved compared to the same cured elastomeric composition having conventional N200 series carbon black.

8. An ASTM N200 grade carbon black with a HI via QTM of greater than about 2.3 and an oil absorption number (OAN) of less than about 135 ml/100 g.

9. A polymeric composition comprising a polymer and a carbon black with a ΔD50/M greater than about 0.9, a HI via QTM greater than about 2.3, and an oil absorption number (OAN) less than about 135 ml/100 g.

10. The polymeric composition of claim 9 wherein the polymer comprises rubber.

* * * * *